(12) United States Patent (10) Patent No.: US 9,157,771 B1
Scholes et al. (45) Date of Patent: Oct. 13, 2015

(54) IDENTIFICATION SYSTEM AND METHOD

(71) Applicant: The Boeing Company, Chicago, IL (US)

(72) Inventors: Dallas Steven Scholes, Buckley, WA (US); Eric Paul Oman, Lake Saint Louis, MO (US); Roger David Bernhardt, Ofallon, MO (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 13/668,670

(22) Filed: Nov. 5, 2012

(51) Int. Cl.
*G01D 5/39* (2006.01)
*H04N 7/18* (2006.01)

(52) U.S. Cl.
CPC . *G01D 5/39* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 4,635,136 A | 1/1987 | Ciampa et al. | |
| 5,058,174 A | 10/1991 | Carroll | |
| 5,283,643 A * | 2/1994 | Fujimoto | 348/143 |
| 6,273,338 B1 | 8/2001 | White | |
| 6,424,930 B1 * | 7/2002 | Wood | 702/184 |
| 7,245,221 B2 | 7/2007 | Claudatos et al. | |
| 7,290,707 B2 * | 11/2007 | Sawasaki | 235/385 |
| 7,370,803 B2 | 5/2008 | Mueller et al. | |
| 7,721,967 B2 | 5/2010 | Mueller et al. | |
| 7,774,233 B2 | 8/2010 | Barber et al. | |
| 8,091,782 B2 | 1/2012 | Cato et al. | |
| 8,146,814 B2 | 4/2012 | Mueller et al. | |
| 8,164,886 B1 * | 4/2012 | Shelander et al. | 361/679.01 |
| 2003/0124903 A1 * | 7/2003 | Inagaki et al. | 439/502 |
| 2006/0250235 A1 * | 11/2006 | Astrin | 340/539.22 |
| 2011/0001699 A1 * | 1/2011 | Jacobsen et al. | 345/157 |
| 2013/0038633 A1 * | 2/2013 | Maggiore | 345/633 |
| 2013/0083960 A1 * | 4/2013 | Kostrzewski et al. | 382/103 |
| 2013/0107036 A1 * | 5/2013 | Jensen | 348/135 |

* cited by examiner

*Primary Examiner* — Xiao Wu
*Assistant Examiner* — Steven Elbinger

(57) ABSTRACT

A inventory identification method and system disclosed herein that includes a low electromagnetic radiation display device, at least one sensor electrically connected to the low electromagnetic radiation display device, an optical imaging device configured to optically generate an image of a display output of the low electromagnetic radiation display device, the display output configured to graphically represent at least one value received from the at least one sensor. The system further includes an optical processing system configured to receive and process the image from the display output of the low electromagnetic radiation display to determine device data based on the processed image, and a data transmitter configured to transmit the device data to a remote data collection device.

20 Claims, 6 Drawing Sheets

IDENTIFICATION SYSTEM AND METHOD

TECHNICAL FIELD

The field of the embodiments presented herein is directed toward a system and method that enables remote monitoring of devices and their corresponding storage apparatus in a low electromagnetic emission environment where various device parameters are collected via sensors and transmitted to remote collection and reporting locations.

BACKGROUND

Militaries currently spend countless man-hours devoted to annually inspecting and recording of the status of weapons and supplies. Current methodologies demand a hands-on process that requires the opening and inspection of sealed containers and devices to determine operational life limit values, (i.e., expiration of batteries, etc.), evaluation of shock (i.e., when a device is dropped), and to determine if exposure to environmental parameters outside of designed operational limits has occurred. Methods to remotely capture this information must do so without exceeding the electromagnetic limitations, e.g., imposed by Hazards of Electromagnetic Radiation to Ordnance (HERO) restrictions.

The existing solutions rely upon the physical opening of bunkers where the devices are housed, maneuvering the devices to an appropriate location, opening the sealed containers where the devices are stored and performing an operational evaluation upon the device or system to determine if it is still functional. These solutions and conditions rely upon human access and test equipment for analysis which is cumbersome, exposes the devices to the outside environment, and are very labor intensive due to the storage methods for these devices. Inspection teams require personnel with specific skillsets in order to conduct the testing who are in high demand thereby limiting the operational availability of these composite teams. These solutions rely upon mechanical or electro mechanical systems that are performed by hands-on inspectors and do not determine daily trends, potential spikes in environmental factors, (e.g., temperature, humidity or shock, etc.), and do not determine a devices or system's status or health remotely in real time. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

A inventory identification system disclosed herein includes a low electromagnetic radiation display device, at least one sensor electrically connected to the low electromagnetic radiation display device, an optical imaging device configured to optically generate an image of a display output of the low electromagnetic radiation display device, the display output configured to graphically represent, and at least one value received from the at least one sensor. The system further includes an optical processing system configured to receive and process the image from the display output of the low electromagnetic radiation display to determine device data based on the processed image, and a data transmitter configured to transmit the device data to a remote data collection device.

An inventory identification system for a restricted electromagnetic radiation environment is disclosed herein including a display device electronically connected to a device accountable to the inventory identification system, the display device and the device being co-located within the restricted electromagnetic radiation environment. The system further includes a sensor electrically connected to the display device, the sensor being located within the restricted electromagnetic radiation environment and transmitting signals to the display device representing real-time changes in environmental conditions within the restricted electromagnetic radiation environment, the sensor being co-located with the device within the restricted electromagnetic radiation environment. The system further includes an electrical connection between the display device and the device accountable to the inventory identification system, the electrical connection receiving data from the device indicating a device status. The system further includes an optical imaging device configured to generate an image of a graphical display on the display device, the graphical display being generated by the display device based on the signals transmitted from the sensor and the data received from the electrical connection, the optical imaging device being co-located with display device within the restricted electromagnetic radiation environment. The system further includes a processor receiving the image of the graphical display and determining device data based reading contents of the graphical display. The system further includes a transmitter outside of the restricted electromagnetic radiation environment configured to transmit the device data to a remote inventory identification accounting device.

A method for inventory identification of a device in a restricted electromagnetic radiation environment is disclosed herein, where the method provides a low electromagnetic radiation display device configured to generate a display output on a low electromagnetic radiation graphical display. The method further provides receiving signals from at least one sensor and signals from the device associated with the low electromagnetic radiation display device. The method further provides generating the display output based on the signals from the at least one sensor and data received from the device, and generating an image of the display output at a remote location from the low electromagnetic radiation display device. The method further provides processing the image to determine device data representative of the signals from the at least one sensor and the signals from the device, and transmitting the device data to another remote location.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

Aspects disclosed herein allow for the remote monitoring and analysis of a wide range of systems, components, sub-components or lifecycle elements at a specified location allowing for changes in characteristics or conditions that could inflict an effect leading to an unacceptable condition or status. These aspects give the ability to monitor and record the status in real time, (as related to its operational performance or intended use environment), and provide analytical process that are capable of predicting and determining behavioral patterns consistent with specified operational parameters.

The aspects presented herein are unique in their capability to not only actively send back real-time status for a system, but to also incorporate predictive analytics that enable pattern analysis to determining effects upon the life span for the system being monitored. The system incorporates the use of specialized sensors that are emplaced near, attached to, or within the device being monitored. A system collaboration/collection point eliminates the need for RF radiation through the use of optical reading that mitigates the need to saturate an environment with electromagnetic EM radiation. This enables real time asset and health management where the system brings in health analytics that continually analyzes exposure and predicts the life limited duration for the device or system being monitored. Unique sensor data can also be adjusted for man portable, remote robotics, Unmanned Aerial Vehicles (UAVs), ground system or any combination of above. These unique operational parameter capabilities, form factors and adaptability to conditional variables and processed allow for the algorithms to determine system behaviors.

This system presented herein tracks, records and analyzes the environment that the device/system is exposed to on a continuous basis and provides for sending back that information without the requirement to create large scale metering system, or exposing the storage places to high levels of electromagnetic radiation, and ensures the security for these systems by not divulging sensitive electromagnetic (EM) converted data to outside "airwaves."

Figure 1:
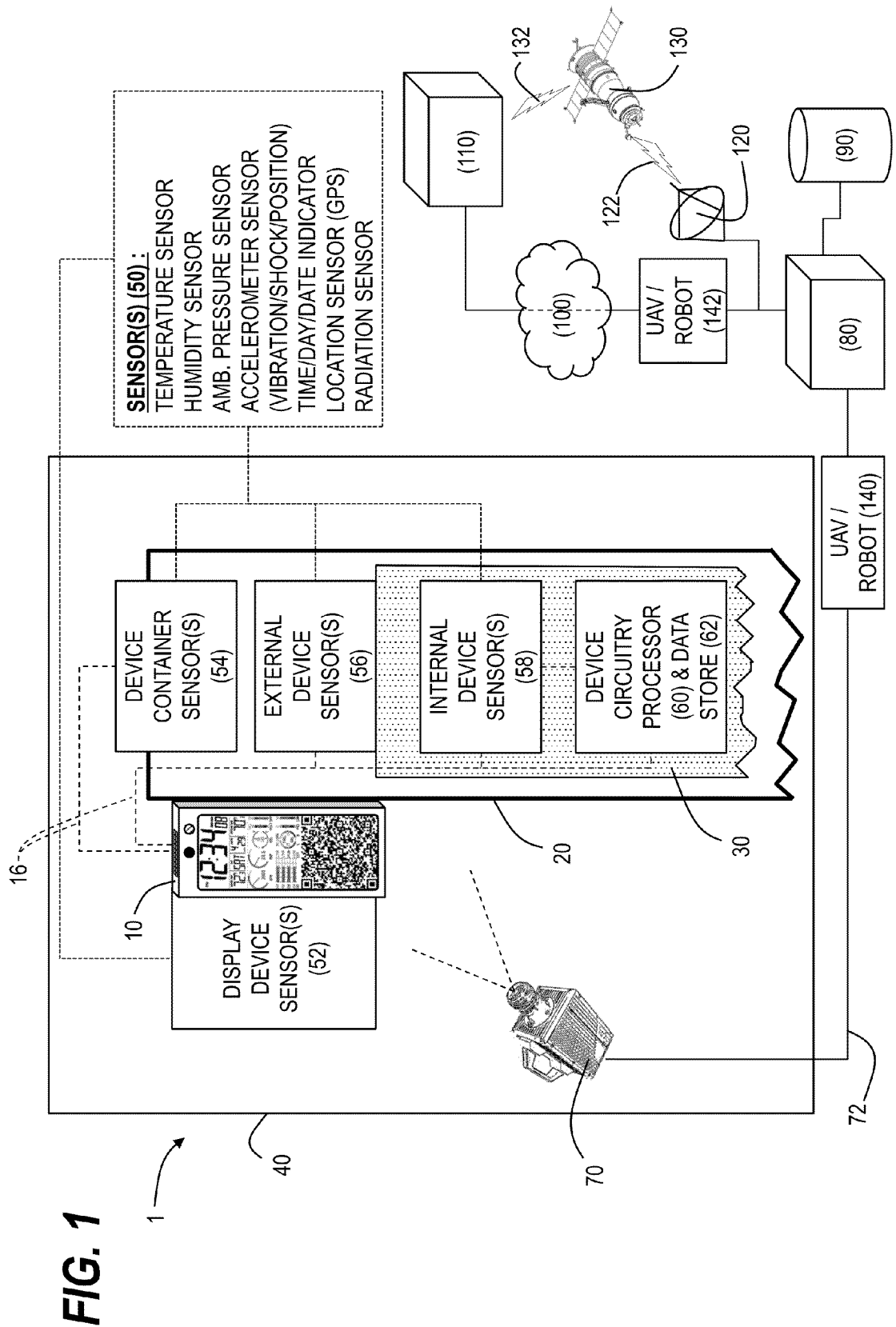
FIG. 1 illustrates a schematic diagram of an inventory identification system according to at least one embodiment disclosed herein.

Generally, the elements presented herein utilizing an optically passive camera to analyze, for example, an e-ink display coupled to a series of internally mounted sensors (shock, thermal, humidity, etc.) as well as externally mounted sensors (light, heat, vibration etc.) and sending this data through a predetermined video surveillance encrypted communication system back to a post processing location. The sensor data will be compared to known data for the operational parameters of the system to determine applicable life history, durability, exposure limits, etc. The device display is an adaptive display that records pertinent system information like ASN, Manufacturer, Date, and 3-D geo-location information as well as internal sensor data and provides real time human and machine readable output, based upon the specific sensor input. The system also provides for the analysis of the data throughout its history. This system of system approach incorporates all facets of the methods, the sensors, the communication and analysis of the data FIG. 1 illustrates a schematic diagram of an inventory identification system 1 that includes a low electromagnetic radiation display device 10, (also illustrated in more detail in FIG. 2), attached in one configuration to a container 20 that holds a device 30 subject the inventory identification system, or in another configuration being directly attached to the device 30 itself, (not illustrated). The device can include any object or series of objects that require an accounting within the inventory identification system 1. These above set of elements can be located within a low electromagnetic radiation enclosure 40 designed to protect the stored devices 30 from most electromagnetic radiation emissions.

At least one sensor 50 can output a signal to the low electromagnetic radiation display device 10 based on a measurement of environmental or situational parameters. The sensor 50 can include: a temperature sensor that outputs a temperature signal; a humidity sensor that outputs a relative humidity signal; an ambient pressure sensor that outputs an ambient pressure; an accelerometer sensor that outputs a signal indicating an amount of vibration or shock; a time/day/date indicator that outputs corresponding timing signals; a location sensor that outputs Global Positioning System (GPS) coordinates or an accelerometer that indicates a position; a radiation sensor that outputs a radiation level or a cumulative radiation exposure parameter; and any other sensing device that measures and outputs environmental or situational parameters.

Sensors 50 can be configured to be positioned upon various places within inventory identification system 1. The low electromagnetic radiation display device 10 can itself contain a display device sensor(s) 52. Alternatively, the device container 20 can include a device container sensor(s) 54 configured on an external or internal member of the device container 20. The device 30 can also have sensors 50 located in a variety of locations depending on the type of information required to be collected by the low electromagnetic radiation display device 10, for example, an exterior mounted device sensor(s) 56, and/or an interior located device sensor(s) 58. The external device sensor(s) 56 and/or the internal device sensor(s) 58 can communicate with a device circuitry processor 60 and device data store 62 to process, and/or store signals from the sensors 50, and/or retrieve stored sensor data for calculation of an operational status of the device 30, as described below.

Figure 2:
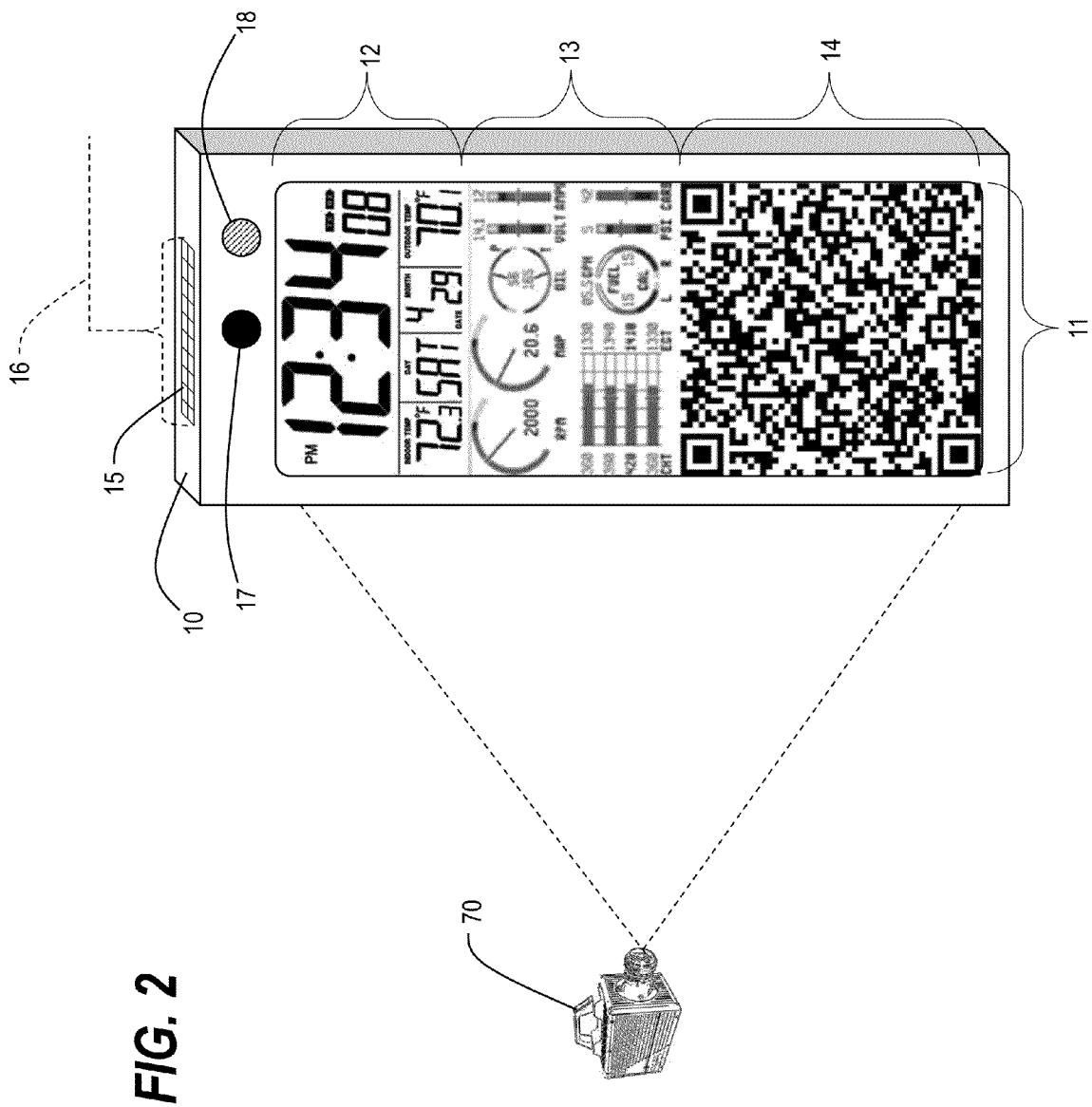
FIG. 2 illustrates a low electromagnetic radiation display device as depicted in FIG. 1, according to at least one embodiment disclosed herein.

FIG. 2 illustrates a low electromagnetic radiation display device 10 as depicted in FIG. 1 including a low electromagnetic radiation graphical display 11 that can include any type of low electromagnetic radiation display technology, for example, electronic ink (e-ink), liquid crystal display (LCD), light emitting diode (LED). The low electromagnetic radiation graphical display 11 can use little or no electromagnetic radiation backlighting and can display various types and combinations of graphical information, namely, an alpha-numerical data display 12, a graphical data display 13, and a 2-D barcode image 14.

Further, the low electromagnetic radiation display device 10 includes a processor, (not illustrated), that enables the generation of graphical information, i.e., an alpha-numerical data display 12, a graphical data display 13, and/or a 2-D barcode image 14, each based on at least one or more values received from the at least one or more sensors 50 and/or any computed values from the device circuitry processor 60 and/or the data store 62. The generation of computed values by device circuitry processor 60 can be based on a signal(s) received from any sensor 50 and processed by the device circuitry processor 60 in the device 30. Additionally, the generation of graphical display information based on sensor output can occur in real-time due to the immediate receipt of output from any of the sensors 50.

The low electromagnetic radiation display device 10 further includes an electrical input/output interface 15 used to receive electrical input from the sensor(s) 50 and the device circuitry processor 60 and device data store 62, (see FIG. 1), via conductors connected to a signal conductor harness 16. The low electromagnetic radiation display device 10 further includes a display device camera 17 used to capture images and process them via an on onboard processor, (not illustrated), and an electromagnetic radiation receiver/emitter 18 used to receive and emit particular wavelengths of electromagnetic radiation that do not interfere with the devices 30 in the low electromagnetic radiation enclosure 40. These wavelengths can include visible light, or near-visible wavelengths such as infrared (IR) or ultraviolet (UV) emissions.

Furthermore, the low electromagnetic radiation display device 10 can include a wireless data transmitter/receiver (transceiver), (not illustrated), to communicate with a remote communication device, (not illustrated), when the low electromagnetic radiation display device 10 is removed from the low electromagnetic radiation enclosure 40, or when operating within the low electromagnetic radiation enclosure 40 in a manner that will not interfere with the device(s) 30. The low electromagnetic radiation display device 10 can include a smart phone or other portable wireless communication device having a multi-function graphical user interface such as a touch screen display.

FIG. 1 further illustrates the inventory identification system 1 further includes an optical imaging device 70 configured to image any graphical display presented on the low electromagnetic radiation graphical display 11. The image captured by the optical imaging device 70 is transmitted via an optical imaging device data communication line 72 to an optical image processing and communication system 80 configured to be located outside the low electromagnetic radiation enclosure 40, or configured to be within the low electromagnetic radiation enclosure 40, (not shown). The optical image processing and communication system 80 receives the image of the graphical display and performs machine image recognition on the image or various portions of the image to extract device data that can be stored at and later retrieved from a storage device 90, and/or can be transmitted by a transmitter within the optical image processing and communication system 80 to a remote data collection/reporting device 110 via a wireless/wired, (i.e., illustrated as a cloud/ broken line), network 100, or via a satellite uplink antenna 120 that transmits a satellite uplink data transmission 122 to a satellite or an Unmanned Aerial Vehicle (UAV)/robot 130 that in turn transmits a satellite downlink or wireless data transmission 132 to the remote data collection/reporting device 110.

Additionally, an Unmanned Aerial Vehicle (UAV)/robot 140 may collect the image data from the optical imaging device 70 for transmission to the optical image processing and communication system 80. Likewise, an Unmanned Aerial Vehicle (UAV)/robot 142 may collect the transmission data from the optical image processing and communication system 80 for transmission to the remote data collection/ reporting device 110 via the network 100. In this configuration, a UAV/robot, may receive the signal from either the optical imaging device 70 or the optical image processing and communication system 80, and send it through the network 100.

In situations where items in enclosed containers on a ship need to be accounted for, a robot may include the optical imaging device 70 that traverses each container to collect photographic image information from external sides of the enclosed containers for each item and then poll that data and send a burst communication. Therefore, the robot would take the place of a human collecting the data, thereby automating data collection in remote or hazardous locations. In situations where items in containers are in a moving convoy operation, a UAV, (e.g., reference no. 140), may perform a flyover to collect the image date from the optical imaging device 70, and send the information back through the wide area network 100 used by a military or some other secure channel.

The extracted device data from the image can include in addition to the data collected from the sensors 50, a physical location of the device, an operational status of the device, and a service status indicating a remaining time period for a service-life of the device. The operational status and the service status of the device can be determined from collected sensor 50 signal data and/or information stored within the data store 62 of the device 30 based on a time keeping device measuring a lifetime of the device 30, and/or signals received from at least one sensor 50 measuring environmental conditions encountered by the device 30 over the device's lifetime.

In summary, an inventory identification system includes a low electromagnetic radiation display device 10, at least one sensor 50 electrically connected to the low electromagnetic radiation display device 10, and an optical imaging device 70 configured to optically generate an image displayed on the low electromagnetic radiation display device 10, where the image can be configured to graphically represent at least one value received from the at least one sensor 50. The optical processing system 80 can be configured to receive and process the image to determine device data based on the processed image, and a data transmitter can be configured to transmit the device data to a remote data collection device 110.

The sensor(s) 50 can further include a temperature sensor, a humidity sensor, an ambient pressure sensor, a vibration or shock (accelerometer) sensor, a location or position sensor, or a time, day or date indicator, or a radiation sensor. Each of these sensors can be configured to be physically located within the low electromagnetic radiation display device 10, on or within a container 20 of the device 30, and/or on an exterior or interior portion of the device 30.

The low electromagnetic radiation display device 10 can be configured to be physically co-located with the device 30, can be configured to receive data from a device circuitry processor 60 and data store 62 of the device 30, and can be configured to generate a low-level light display or a no-light emission display for the display output. When a no-light emission display is presented, the optical imaging device 70 can illuminate at least a portion of an image displayed on low electromagnetic radiation graphical display 11 with an illumination source, (not illustrated), to enable capturing an image on the low electromagnetic graphical display 11.

Figure 3:
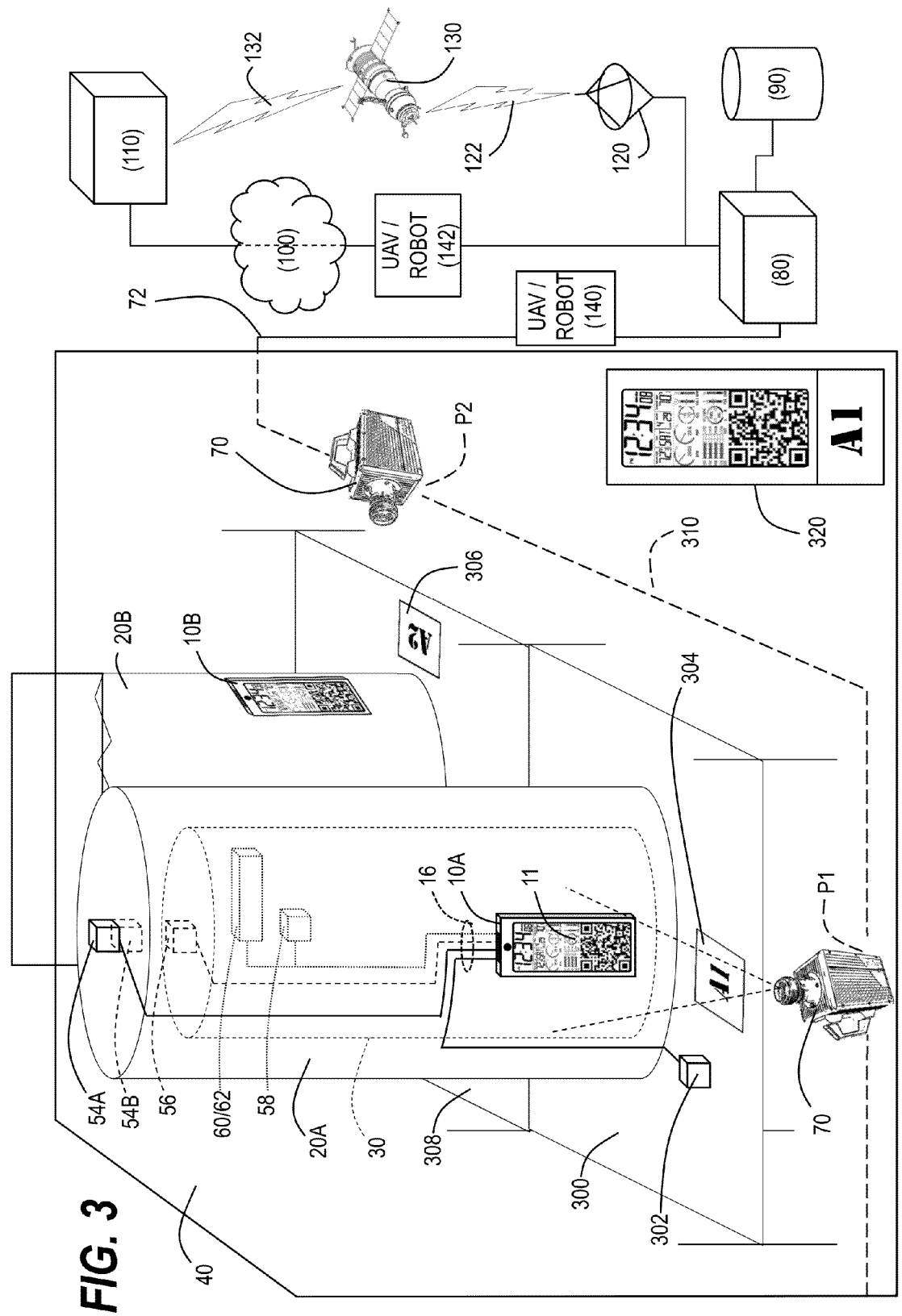
FIG. 3 illustrates a perspective view of an inventory identification system according to at least one embodiment disclosed herein.

FIG. 3 illustrates a perspective view of an inventory identification system where a first low electromagnetic radiation display device 10A is co-located with a first device container 20A that contains a device 30 accountable to the inventory identification system within the low electromagnetic radiation enclosure 40. The first device container 20A and device 30 in this embodiment are located on a storage device 300 of a larger storage device system. The storage device 300 includes a first storage device ID tag "A1" 304 that identifies the location of the first device container 20A and device 30 within the larger storage device system. A storage mounted sensor 302 located on the storage device 300 communicates with the first low electromagnetic radiation display device 10A via the signal conductor harness 16 as illustrated in FIGS. 1 and 2. An external device container sensor 54A and an internal device container sensor 54B communicate with the first low electromagnetic radiation display device 10A via the signal conductor harness 16, as does an external device sensor 56 mounted on the device 30. Additionally, internal device sensor 58, device circuitry processor 60 and device data store 62 can communicate with the first low electromagnetic radiation display device 10A via the signal conductor harness 16.

The first low electromagnetic radiation display device 10A can process each of the signals it receives from any of the sensors in real time, in addition to any computational data it receives from the device circuitry processor 60 and device data store 62, and display an image via its low electromagnetic radiation graphical display 11 that represents the received sensor data and/or the computational data.

The optical imaging device 70 is configured to travel along an optical imaging device pathway 310 under manual or automatic control to a first optical imaging device position P1 in order to further generate an image of the image displayed on the low electromagnetic radiation graphical display 11 and the first storage device ID tag "A1" 304. This image generated by the optical imaging device 70 can be stored locally on the optical imaging device 70 or can be transmitted after imaging via the optical imaging device data communication line 72 to the optical image processing and communication system 80.

A first optical imaging device position P1 representative image 320 illustrates a combination of the graphic image generated by the first low electromagnetic radiation display device 10A and the first storage device ID tag "A1" 304. This representative image 320 is processed by the optical image processing and communication system 80 to determine device data that can be transmitted to the remote data collection/reporting device 110.

In a similar manner, the optical imaging device 70 is configured to travel along an optical imaging device pathway 310 under manual or automatic control to a second optical imaging device position P2 in order to further generate an image of another image displayed on a second low electromagnetic radiation display device 10B on a second device container 20B and the second storage device ID tag "A2" 306 of a second storage device 308 of a storage device system. This next image generated by the optical imaging device 70 can be stored locally on the optical imaging device 70 with previously storage images, or can be transmitted after imaging via the optical imaging device data communication line 72 to the optical image processing and communication system 80.

In summary, the optical imaging device 70 can be mounted to an automatic or manual translation system configured to move the optical imaging device 70 along a predetermined path 310 to generate a series of images, each image containing a display output of one of a plurality of low electromagnetic radiation display devices. Additionally, the optical imaging device 70 may be adapted to pan and zoom to thereby image the necessary devices. This panning and zooming function may enable the optical imaging device 70 be centrally located or have a limited travel path, and yet still be able to image the necessary devices. The image generated by the optical imaging device 70 can additionally include a storage location indicium 304, 306 or a storage device identifier associated with a physical location of the low electromagnetic radiation display device 10A/10B within a storage device system.

Figure 4:
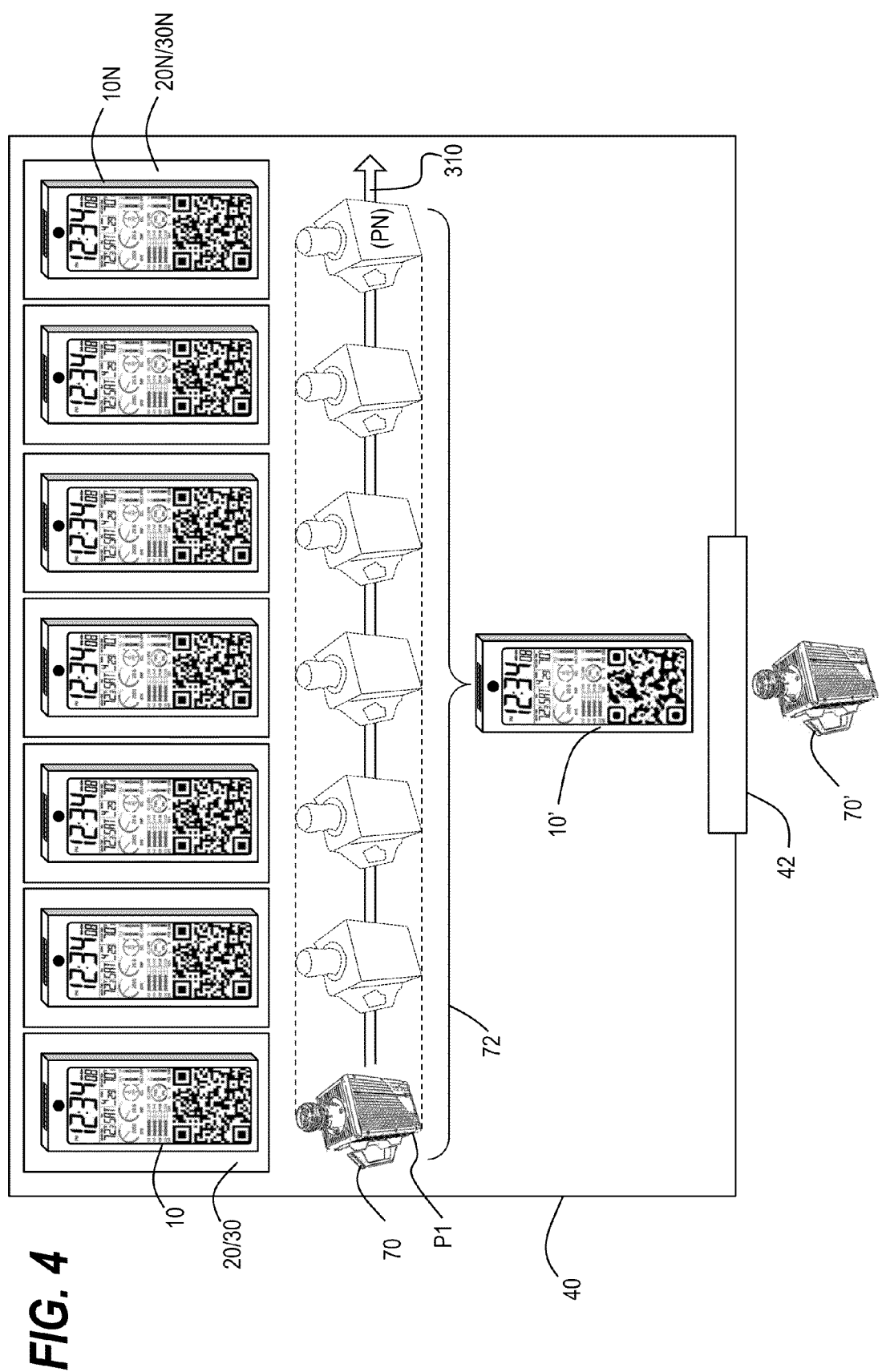
FIG. 4 illustrates a schematic diagram of one aspect of an inventory identification system according to at least one embodiment disclosed herein.

FIG. 4 illustrates a schematic diagram of one aspect of an inventory identification system where a number of low electromagnetic radiation display devices 10-10N are disposed on respective device containers/devices 20/30-20N/30N. An optical imaging device 70 travels along an optical imaging device pathway 310 from positions P1-PN corresponding to each combination of low electromagnetic radiation display devices 10-10N and respective device containers/devices 20/30-20N/30N, and creates an image of each low electromagnetic radiation graphical display 11. The images can be either stored on the optical imaging device 70 for transmission at a predetermined time, or can be transmitted after each image via the optical imaging device data communication line 72 to another single low electromagnetic radiation display device 10', where the individual transmitted images can be processed to generate individual device data, the generated individual device data can be accumulated, and the accumulated data can be used to generate an accumulated graphical image on the other single low electromagnetic radiation display device 10'. All of these functions can take place within the confines of a low electromagnetic radiation enclosure 40 such that no individual device data extracted from any of the displayed images can leave the low electromagnetic radiation enclosure 40 until it is accumulated and a graphical display is generated that represents the accumulated device data.

Thereafter, a second optical imaging device 70' captures the accumulated graphical image on the other single low electromagnetic radiation display device 10' via an optically transparent portal 42 in the low electromagnetic radiation enclosure 40. The accumulated graphical image is then transmitted to the optical image processing and communication system 80, (as illustrated in FIGS. 1 and 3), for processing and transmission in like manner as previously disclosed.

Figure 5:
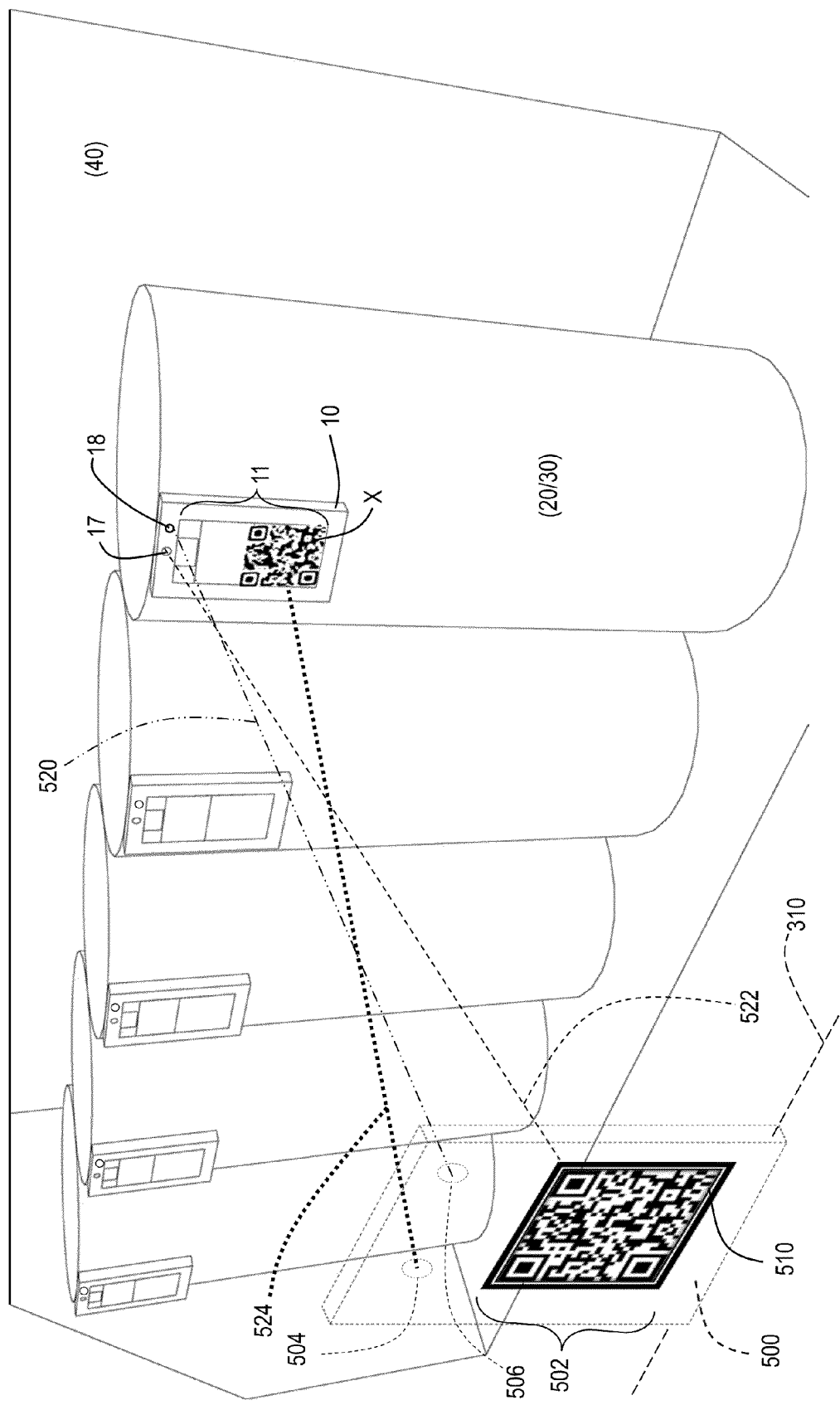
FIG. 5 illustrates a perspective view of another aspect of an inventory identification system according to at least one embodiment disclosed herein.

FIG. 5 illustrates a perspective view of another aspect of an inventory identification system where the optical imaging device 70 of FIG. 1 and FIGS. 3-4 has been modified to enable bi-directional communication with the low electromagnetic radiation display devices 10. A bi-directional optical imaging device 500 includes a low electromagnetic radiation graphical display 502 in addition to an optical imaging camera 504 and a low-level electromagnetic radiation emitter/receiver 506 that travels along an optical imaging device pathway 310.

The bi-directional optical imaging device 500 operates in a similar manner as disclosed above with respect to capturing images of the graphical display of device 30 and device processor data on the low electromagnetic radiation graphical display 11 by capturing a graphical display, for example, 2-D barcode image 14 along a bi-directional optical imaging device camera 504 direction 524. However, the combination of the low electromagnetic radiation display device 10 and the bi-directional optical imaging device 500 can be configured to transmit programming or data from the bi-directional optical imaging device 500 to the device 30 via the electrical connections, (16, see for example, FIG. 2), of the low electromagnetic radiation display device 10 to the device circuitry processor 60 and device data store 62 of the device 30.

First, the bi-directional optical imaging device 500 can display a graphical image, for example, a 2-D barcode image 510, on its low electromagnetic radiation graphical display 502. Next, the bi-directional optical imaging device 500 can emit via the low-level electromagnetic radiation emitter 506 a specific wavelength low-level electromagnetic radiation signal 520 to be received by the electromagnetic radiation receiver/emitter 18 of the low electromagnetic radiation display device 10. The receipt and acknowledgement of the low-level electromagnetic radiation signal 520 by the low electromagnetic radiation display device 10 causes the display device camera 17 to be activated and capture an image of the 2-D barcode image 510 being displayed on the bi-directional optical imaging device 500 in a display device camera image direction 522. A processor in the low electromagnetic radiation display device 10 extracts binary information from the 2-D barcode image 510 necessary for programming the device 30 via the device circuitry processor 60 or for storage at the device 30 via the device data store 62. The extracted binary information is then transmitted via the electrical input/output interface 15 through the signal conductor harness 16 to the appropriate component in the device 30. Thereby, the device can be reprogrammed in a low electromagnetic radiation enclosure 40 without jeopardizing any electromagnetic radiation sensitive items or devices within the low electromagnetic radiation enclosure 40.

In summary, a low electromagnetic radiation display device 10 receives via its display device camera 17 an image of a graphical display physically presented before the display device camera on the bi-directional optical imaging device 500 and processed by the processor to generate a data file associated with a device 30 electrically connected to the low electromagnetic radiation display device 10. Thereafter, the low electromagnetic radiation display device 10 transmits the generated data file via the electrical input/output interface 15 to the device 30. Alternatively, each low electromagnetic radiation display device 10 can be the target to receive the generated data file and thereby be reprogrammed or receive data in a like manner.

To accomplish this bi-directional communication the bi-directional optical imaging device 500 further including a low-level electromagnetic radiation emitter 506 and low electromagnetic radiation graphical display 502. The low electromagnetic radiation display device 10 further includes an electromagnetic radiation receiver/emitter 18, where the bi-directional optical imaging device 500 can be configured to transmit a low-level electromagnetic radiation signal 520 to the electromagnetic radiation receiver/emitter 18 of the low electromagnetic radiation display device 10. A graphical programming image on the low electromagnetic radiation graphical display 502 and the low electromagnetic radiation display device 10 generates a programming image of the graphical programming image, processes the graphical programming image to generate programming, and transmits the programming to the device 30 via the electrical connection 15.

Figure 6:
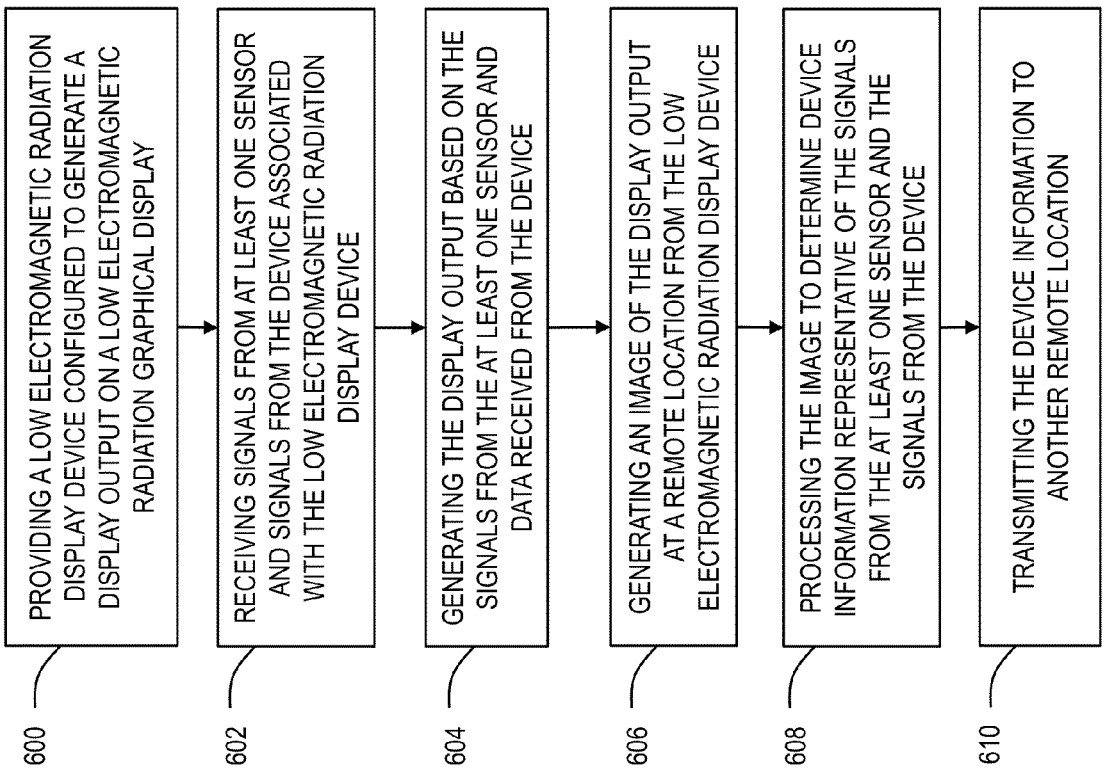
FIG. 6 illustrates a logic flowchart of a method inventory identification of a device in a restricted electromagnetic radiation environment.

FIG. 6 illustrates a logic flowchart of a method for inventory identification of a device in a restricted electromagnetic radiation environment. The method includes providing 600 a low electromagnetic radiation display device configured to generate a display output on a low electromagnetic radiation graphical display. Signals can be received 602 from at least one sensor and signals from the device associated with the low electromagnetic radiation display device. Display output can be generated 604 based on the signals from the at least one sensor and data received from the device. An image can be generated 606 of the display output at a remote location from the low electromagnetic radiation display device. The image can be processed 608 to determine device data representative of the signals from the at least one sensor and the signals from the device, and the device data can be transmitted 610 to another remote location.

This system has the ability to record information and if required, provide power to the device for system testing and evaluation. This data is then combined with other environmental data and displayed upon a display device. This display then is read by a specialized optical camera system designed for the operating environment and contains the programmed geographic locations and operational, (zoom, etc.), characteristics for all of the devices. The display device also incorporates internal and external sensors that the device may not internally include which can include: vibrational accelerometers, gravity accelerometer, humidity and temperature sensors. The exact list of sensors may be determined by the nature of the asset being measured and analyzed. Each of these activities is recorded and reflected in data in the display by means of, e.g., a 2-D barcode. This continuous updating of information makes the barcode adaptive with real-time dynamic information. This data is then read by an optical camera that knows the exact location and method for reading the screen. In some cases this may be done in other then optical light to allow for low light requirements or it may be done in daylight type conditions. The current method allows for storing certain devices inside light limited bunkers which may require the displays of the display devices to be back-lit. The data from the optical scan is then relayed into computer system via remote (cell) or tethered (landline) methods depending upon the security needs of the customer and the database is updated.

Additionally the system provides for automated vehicle/platform health analytics to be conducted onboard the system or remotely and these "changes in status" are displayed upon the display device. The system also incorporates a method to alert the asset managers if any number of parameters fall within a set alert zone and the system automatically sends the communication alerts sent out to asset managers. An analytics section includes current, predictive, and historical analytics that allows for the prediction in degradation of useable/useful life expectancy. For example if a device was exposed to over 4 hours in excess of 100 degrees this may conditionally degrade the life expectancy for the system and the analytical system upon detecting this may send updates to the display and send alerts to the asset managers. All of the conditional parameters are programmable by the asset managers. Additionally, any preset safety triggers for the asset (e.g., exceeded vibrational parameters during an earth-quake), may when tripped for the asset may also be flagged on the display, in the system and an update may be sent to the communication module to alert the asset manager declaring the asset as non-functional until repaired. The system may also contain a permanent historical record for reference by the asset manager.

The system is secure having defined method for access control and automated notification procedures performed outside a sensitive electromagnetic environment of a storage facility. The system incorporates the entire life of a product from arrival at the location, to transportation throughout the facility during storage, to shipping, and disposition. This concept may be used in systems where low light/low electromagnetic environments are required or even where exposure to elements is potentially damaging. This system may be used to prevent spoilage in areas where disruption of any environmental features limits daily access but demands real time monitoring (cold storage of fruit for example). Another significant feature of this concept is its ability to be integrated into any transportation method(s) (any transportation type) where there are times where access to the system for hands-on monitoring is precluded. This system may provide the method to monitor and communicate the status as well as the analytical mechanisms and historical accuracy necessary to ensure that the product is delivered ready for use.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. An inventory identification system, comprising:
at least one sensor configured to output a signal including at least one value based on measurements of at least one of an environmental parameter and an inventory-item parameter of an inventory item;
a low electromagnetic radiation display device associated with the inventory item tracked by the inventory identification system, the low electromagnetic radiation display device electrically connected to the at least one sensor and configured to receive the signal of the at least one sensor and graphically represent the signal as a display output, wherein the low electromagnetic radiation display device and the inventory item are configured to be co-located within a restricted electromagnetic radiation environment;
an optical imaging device optically coupled to the low electromagnetic display device and configured to optically generate an image of the display output, the image configured to graphically represent the at least one value;
an optical processing system configured to receive and process the image to determine device data based on the processed image; and
a transmitter configured to receive the sensor data from the optical processing system and transmit the device data to a remote data collection device.

2. The inventory identification system according to claim 1, wherein the low electromagnetic radiation display device further includes:
a low electromagnetic radiation graphical display;
an electrical input/output interface;
a display device camera;
at least one internal sensor; and
a processor configured to generate graphical display data on the low electromagnetic radiation graphical display, the low electromagnetic radiation graphical display data including a representation of the signal received from the at least one sensor via the electrical input/output interface, wherein the at least one sensor is disposed at least one of with one or more of: positions external and internal to the low electromagnetic radiation display device.

3. The inventory identification system according to claim 2,
wherein the low electromagnetic radiation display device receives via the display device camera a second image of a second graphical display physically presented before the display device camera,
wherein the second image of the second graphical display being processed by the processor to generate a data file associated with a device electrically connected to the low electromagnetic radiation display device, and
wherein the low electromagnetic radiation display device transmits the generated data file via the electrical input/output interface to the device.

4. The inventory identification system according to claim 1, the at least one sensor further comprising at least one of:
a temperature sensor;
a humidity sensor;
an ambient pressure sensor;
a vibration or shock sensor;
a location or position sensor; or a time, day or date indicator.

5. The inventory identification system according to claim 1, wherein the at least one sensor further being disposed according to at least one of:
within the low electromagnetic radiation display device;
on a container of the inventory item;
on an exterior portion of the inventory item; or
within an interior portion of the inventory item.

6. The inventory identification system according to claim 1, wherein the display output of the low electromagnetic radiation display device further comprises a graphical representation of a computed value based on the at least one value received from the at least one sensor.

7. The inventory identification system according to claim 1, wherein the optical imaging device further comprises one of:
a camera mounted to an automatic translation system configured to move the camera along a predetermined path to generate a series of images, each image of the series of images containing a display output of one of a plurality of low electromagnetic radiation display devices, wherein the plurality of low electromagnetic radiation display devices comprises the low electromagnetic radiation display device; and
a camera having panning and zooming capabilities.

8. The inventory identification system according to claim 7, wherein each of the series of images generated by the optical imaging device further includes a storage location indicium associated with a physical location of the low electromagnetic radiation display device.

9. The inventory identification system according to claim 1, wherein low electromagnetic radiation display device being configured to receive data from a device circuitry processor and data of the inventory item.

10. The inventory identification system according to claim 1, wherein the low electromagnetic radiation display device being configured to at least one of:
generate a low-level light display or a no-light emission display for the display output;
generate a machine readable 2-D barcode representing the at least one value received from the at least one sensor;
generate graphical representation of at least one value received from the at least one sensor;
generate alpha-numeric representation of at least one value received from the at least one sensor;
graphically represent the signal using an electronic ink display; and
generate the display output in real-time based on the immediate receipt of at least one value from the at least one sensor.

11. An inventory identification system, comprising:
a low electromagnetic radiation display device associated with a device accountable to the inventory and configured to display at least one value received from at least one sensor;
the at least one sensor electrically connected to the low electromagnetic radiation display device to provide the at least one value to the low electromagnetic radiation display device;
an optical imaging device configured to optically generate an image from the at least one value displayed on the low electromagnetic radiation display device, the image configured to graphically represent the at least one value received from the at least one sensor, wherein the optical imaging device further comprises one of:
a camera mounted to an automatic translation system configured to move the camera along a predetermined path to generate a series of images, wherein each image of the series of images containing a display output of one of a plurality of low electromagnetic radiation display devices, wherein the plurality of low electromagnetic radiation display devices comprises the low electromagnetic radiation display device, and a camera having panning and zooming capabilities;

an optical processing system configured to receive and process the image to determine device data based on the processed image;

a transmitter configured to transmit the device data to a remote data collection device;

an additional low electromagnetic radiation display device configured to receive data associated with the series of images and configured to generate an additional display output of the additional low electromagnetic radiation display device graphically representing the data associated with the series of images, and an additional optical imaging device configured to generate an additional image of the additional display output.

12. An inventory identification system for a restricted electromagnetic radiation environment, comprising:

a display device electronically connected to an inventory item tracked by the inventory identification system, the display device and the inventory item being co-located within the restricted electromagnetic radiation environment;

a sensor electrically connected to the display device, the sensor being located within the restricted electromagnetic radiation environment and transmitting signals to the display device representing real-time changes in environmental conditions within the restricted electromagnetic radiation environment, the sensor being co-located with the inventory item within the restricted electromagnetic radiation environment;

an electrical connection between the display device and the inventory item tracked by the inventory identification system, the electrical connection receiving data from the inventory item indicating a device status;

an optical imaging device configured to generate an image of a graphical display on the display device, the graphical display being generated by the display device based on the signals transmitted from the sensor and the data received from the electrical connection;

a processor receiving the image of the graphical display and determining device data based reading contents of the graphical display; and a transmitter outside of the restricted electromagnetic radiation environment configured to transmit the device data to a remote inventory identification accounting device.

13. The inventory identification system for a restricted electromagnetic radiation environment according to claim 12, further comprising:

the optical imaging device further including a low-level electromagnetic radiation emitter and a graphical display device; and the display device further including an electromagnetic radiation receiver, wherein the optical imaging device being configured to transmit a low-level electromagnetic radiation signal to the electromagnetic radiation receiver of the display device, and display a graphical programming image on the graphical display device, and wherein the display device generates a programming image of the graphical programming image on the graphical display device, processes the graphical programming image to generate programming, and transmits the programming to the device inventory item via the electrical connection.

14. The inventory identification system for a restricted electromagnetic radiation environment according to claim 12, wherein the device data includes:

a physical location of the inventory item;

an operational status of the inventory item; and a service status indicating a remaining time period for a service-life of the inventory item.

15. The inventory identification system for a restricted electromagnetic radiation environment according to claim 14, wherein the operational status of the inventory item and the service status of the inventory item being determined within the inventory item based on:

a time keeping device measuring a lifetime of the inventory item; and signals received from at least one sensor measuring environmental conditions encountered by the device inventory item over the lifetime of the inventory item.

16. A method for inventory identification of a inventory item in a restricted electromagnetic radiation environment, the method comprising:

providing a low electromagnetic radiation display device configured to generate a display output on a low electromagnetic radiation graphical display;

receiving signals from at least one sensor and signals from the inventory item associated with the low electromagnetic radiation display device;

generating the display output on the low electromagnetic radiation graphical display, wherein the display output is based on the signals from the at least one sensor and data received from the inventory item, wherein the low electromagnetic radiation graphical display and the inventory item are disposed in the restricted electromagnetic radiation environment;

generating an image of the display output at a remote location from the low electromagnetic radiation display device;

processing the image to determine device data representative of the signals from the at least one sensor and the signals from the inventory item; and transmitting the device data to another remote location.

17. The method of claim 16, further comprising:

receiving, at the low electromagnetic radiation display device via a display device camera, a second image of a graphical display;

processing at the low electromagnetic radiation display device the second image to generate a data file associated with the inventory item; and transmitting the generated data file via an electrical input/output interface to the inventory item.

18. The method of claim 16, wherein generating the display output further comprises:

generating a computed value based on the signal from at least one sensor being processed by a processor in the inventory item.

19. The method of claim 16, further comprising:

translating a camera along a predetermined path associated with a plurality of low electromagnetic radiation display devices; and generating a series of images, wherein each image of the series of images contains a distinct display output of one of a plurality of low electromagnetic radiation display devices, wherein the plurality of low electromagnetic radiation display devices comprises the low electromagnetic radiation display device.

20. The method of claim 19, further comprising:

receiving, with an additional low electromagnetic radiation display device, data associated with the series of images;

generating, with an additional low electromagnetic radiation display device, an additional display output which graphically represents the data associated with the series of images, and generating, with an additional optical imaging device, an additional image of the additional display output.

* * * * *

UNITED STATES PATENT AND TRADEMARK OFFICE
CERTIFICATE OF CORRECTION

PATENT NO. : 9,157,771 B1
APPLICATION NO. : 13/668670
DATED : October 13, 2015
INVENTOR(S) : Scholes et al.

Page 1 of 1

It is certified that error appears in the above-identified patent and that said Letters Patent is hereby corrected as shown below:

In the Claims:

Column 11, Claim 2, Lines 41-42, please delete "least one of with one or more of: positions external and internal" and insert --positions external or positions internal-- therefor;

Column 12, Claim 11, Line 49, please insert --identification system-- after inventory;

Column 13, Claim 13, Line 66, please delete "device";

Column 14, Claim 15, Line 17, please delete "device".

Signed and Sealed this
Twenty-first Day of June, 2016

Michelle K. Lee
*Director of the United States Patent and Trademark Office*